United States Patent [19]
Fujieda et al.

[11] Patent Number: 5,933,550
[45] Date of Patent: Aug. 3, 1999

[54] DATA INPUTTING DEVICE

[75] Inventors: Ichiro Fujieda; Fujio Okumura; Hiroshi Haga, all of Tokyo, Japan

[73] Assignee: NEC Corporation, Tokyo, Japan

[21] Appl. No.: 08/548,761

[22] Filed: Oct. 26, 1995

[30] Foreign Application Priority Data

Oct. 27, 1994 [JP] Japan .................................. 6-263549

[51] Int. Cl.⁶ .............................................. H04N 1/107
[52] U.S. Cl. ........................................ 382/314; 358/473
[58] Field of Search ................................... 358/452, 453, 358/474, 512; 355/218; 382/313, 314, 315; 345/173, 175, 176, 183, 179; 178/18; 364/705.03, 709.11

[56] References Cited

U.S. PATENT DOCUMENTS

| | | | |
|---|---|---|---|
| D. 331,750 | 12/1992 | Yang ........................................ D19/114 |
| 4,660,095 | 4/1987 | Cannella et al. .......................... 358/512 |
| 4,707,747 | 11/1987 | Rockwell, III ............................ 358/294 |
| 4,851,896 | 7/1989 | Maranaga et al. ........................ 358/443 |
| 4,870,483 | 9/1989 | Nishigaki et al. ........................ 358/512 |
| 4,885,640 | 12/1989 | Yoshiura .................................. 358/400 |
| 4,908,718 | 3/1990 | Shimada .................................. 358/494 |
| 4,985,617 | 1/1991 | Ogushi .................................. 250/208.1 |
| 4,985,760 | 1/1991 | Maeshima et al. ....................... 358/512 |
| 5,019,917 | 5/1991 | Hata et al. ............................... 358/448 |
| 5,051,736 | 9/1991 | Bennett et al. ........................... 340/707 |
| 5,091,638 | 2/1992 | Yamazaki et al. ..................... 350/208.1 |
| 5,187,596 | 2/1993 | Hwang .................................... 358/484 |
| 5,193,897 | 3/1993 | Halsey ..................................... 362/118 |
| 5,287,105 | 2/1994 | Schlotterbeck et al. ................. 382/313 |
| 5,313,055 | 5/1994 | Shiratsuki et al. .................... 250/208.1 |
| 5,369,227 | 11/1994 | Stone ........................................ 178/18 |
| 5,387,986 | 2/1995 | Gerhart .................................... 358/452 |
| 5,430,462 | 7/1995 | Katagiri et al. .......................... 345/104 |
| 5,506,394 | 4/1996 | Plesko .................................... 235/472 |
| 5,574,804 | 11/1996 | Olschafskie et al. .................... 358/473 |

FOREIGN PATENT DOCUMENTS

| | | |
|---|---|---|
| 63-184823 | 7/1988 | Japan . |
| 63-257020 | 10/1988 | Japan . |
| 4-45481 | 2/1992 | Japan . |
| 4-195624 | 7/1992 | Japan . |
| 4-369016 | 12/1992 | Japan . |

*Primary Examiner*—Kim Yen Vu
*Attorney, Agent, or Firm*—Sughrue, Mion, Zinn, Macpeak & Seas, PLLC

[57] ABSTRACT

A data inputting device for inputting data to a computer, word processor or data image processor is disclosed. The device has a single inputting unit capable of selectively inputting coordinates or an image. Further, the inputting unit is capable of inputting an image on the basis of absolute coordinates representative of positions on a document.

6 Claims, 12 Drawing Sheets

DATA INPUTTING DEVICE

BACKGROUND OF THE INVENTION

The present invention relates to a data inputting device for inputting data to a computer, word processor or similar data processor and, more particularly, to a data inputting device for inputting coordinates and images.

A data inputting device for the above application has been proposed in various forms in the past. For example, the data inputting device is implemented as a coordinates inputting device or pointing device for inputting coordinates, or an image inputting device for inputting images.

The pointing device may consist of a tablet for detecting coordinates on the basis of capacity coupling, and a pen. Various kinds of pointing devices heretofore proposed each has a particular principle of operation. Japanese Patent Laid-Open Publication No. 4-45481, for example, teaches a device which applies shift pulses to scanning lines extending in an X direction and a Y direction, thereby generating loop currents. This type of device detects the coordinates of an intersection which a pen is positioned, on the basis of the pulse application timing and the pen detection timing. Japanese Patent Laid-Open Publication No. 63-184823 discloses a device capable of determining the position of a pen by use of optical fibers arranged in the vertical and horizontal directions, and a pair of image sensors. Japanese Patent Laid-Open Publication No. 4-369016 proposes a device having a pen whose point issues light, and a protection glass. When the pen is pressed against the protection glass, the coordinates on the glass are detected by a bidimensional CCD sensor. Japanese Patent Laid-Open Publication No. 4-195624 teaches a device having transparent electrodes arranged in the X and Y directions, and an electronic pen having a capacity detecting circuit at the point thereof. This device sequentially applies a frequency of several hundred hertz to the transparent electrodes, and detects a change in the capacity via the detecting circuit while displaying it on a liquid crystal display which plays the role of a tablet at the same time. Further, Japanese Patent Laid-Open Publication No. 63-257020 discloses a device having a tablet implemented as a transparent vibration transfer plate, and a vibration pen. After the vibration transfer plate has been laid on a document, the vibration pen is put on the plate. The vibration of the pen is transferred via the plate to a plurality of sensors arranged on the plate, so that coordinates can be detected.

On the other hand, a handy scanner which is a specific form of the image inputting device has a plurality of rollers, a linear image sensor, and an encoder. The rollers roll on the surface of a document. The image sensor has a width covering an image reading width and is so positioned as to adjoin the document. The encoder is used to sense the movement of the image sensor in the subscanning direction.

A particular inputting unit has been developed for each of the pointing devices and image inputting devices described above. However, modern image processors with advanced functions allow data to be input therein in various modes Moreover, there is an increasing demand for an implementation capable of switching the modes rapidly by, e.g., splitting a screen. This brings about a problem that when both of the two different devices are required, they must be put on a desk together, occupying a substantial space. In addition, the two inputting units must be held by hand alternately or must be replaced with each other on the desk, resulting in inefficient manipulation.

Further, in the conventional handy scanner, the encoder responsive to the movement in the subscanning direction, and rollers for stabilizing the travel of the scanner are arranged around the linear image sensor. Hence, the scanner cannot be reduced in width, i.e., length in the subscanning direction. As a result, the scanner conceals the image reading portion over a substantial width including the line being input. This prevents the operator from accurately seeing the portion being read. Moreover, data available with the encoder built in the scanner are not absolute coordinates representative of the reading surface, but they are relative coordinates, i.e., amounts of rolling or movement. Hence, once the scanner is brought out of contact with the reading surface, it is necessary for the operator to match the beginning of the portion to be read next to the end of the portion previously read. This is further aggravated by the great width of the handy scanner.

SUMMARY OF THE INVENTION

It is, therefore, an object of the present invention to provide a data inputting device having a single inputting unit capable of selectively inputting coordinates or an image.

It is another object of the present invention to provide an image inputting device capable of inputting an image by using absolute coordinates representative of positions on a document.

In accordance with the present invention, a data inputting device includes a tablet. A tablet driver causes the tablet to generate a physical change representative of a position on the tablet. An image sensor reads a document laid on the tablet. Position detecting arrangements respectively adjoin opposite ends of the image sensor and analyze, while the document is read by the image sensor, the physical change generated by the tablet to thereby determine the position of the image sensor relative to the tablet.

Also, in accordance with the present invention, a data inputting device includes a tablet. A tablet driver causes the tablet to generate a physical change representative of a position on the tablet. An image sensor reads a document laid on the tablet. First position detecting arrangements, assigned to image reading, respectively adjoin opposite ends of the image sensor, and analyze, while the document is read by the image sensor, the physical change generated by the tablet to thereby determine the position of the image sensor relative to the tablet. A second position detecting arrangement, assigned to inputting coordinates, includes a pen point configuration, and is accommodated in the same casing as the first position detecting arrangements, and analyzes, when put on the tablet, the physical change to thereby determine a position on the tablet.

Further, in accordance with the present invention, a data inputting device comprises a casing having a pen configuration and formed with an opening, a linear image sensor facing the opening and extending along an axis of the casing and a movable cover for closing and exposing the opening.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
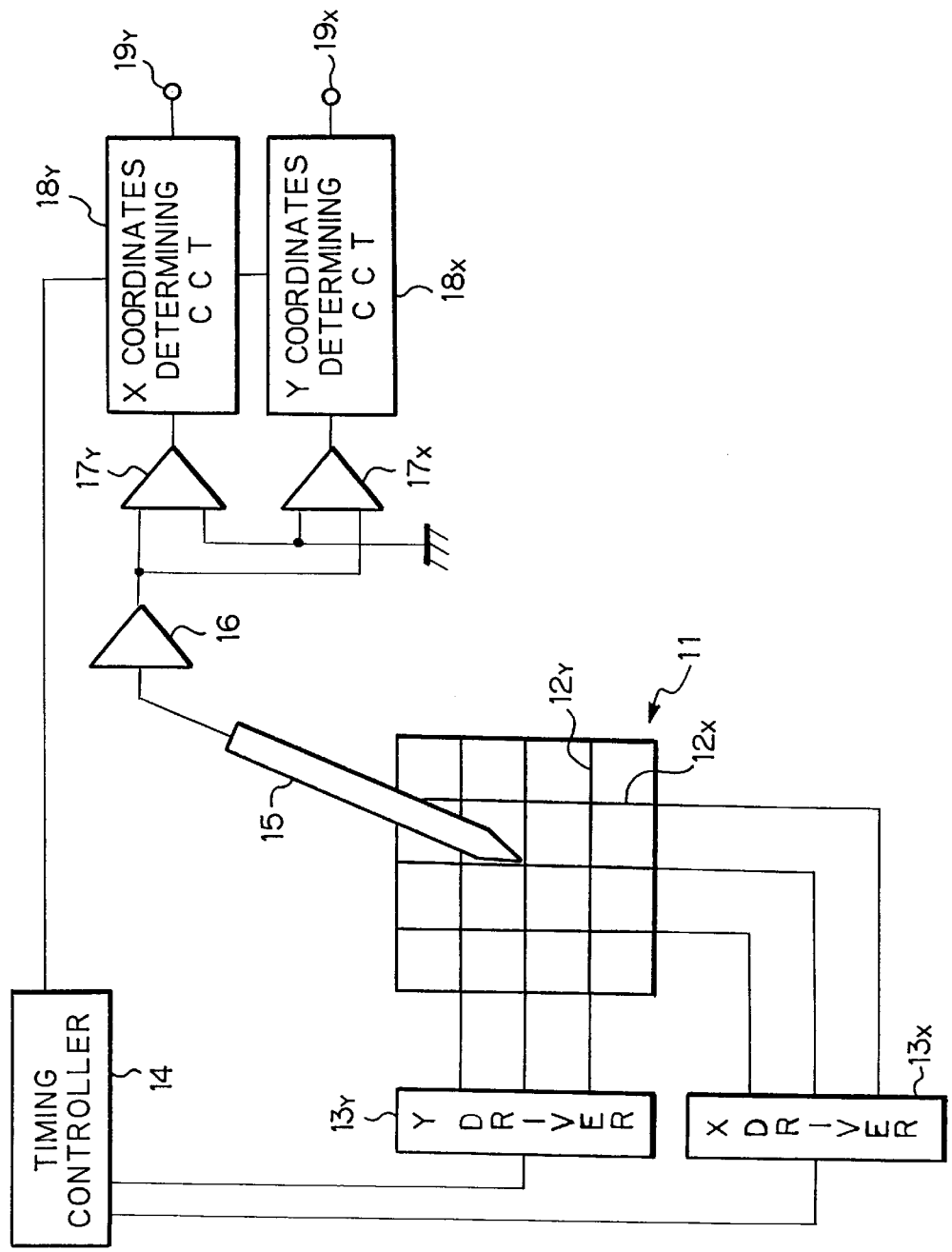
FIG. 1 is a schematic block diagram showing a conventional coordinates inputting device using a pen.

To better understand the present invention, a brief reference will be made to a conventional pointing device using a pen, shown in FIG. 1. As shown, the pointing device includes a tablet 11 for detecting coordinates on the basis of capacity coupling. The tablet 11 has a plurality of electrodes 12$x$ and a plurality of electrodes 12$y$ extending perpendicularly to each other. The electrodes 12$x$ and 12$y$ are arranged at predetermined intervals. The vertical electrodes 12$x$, as viewed in the figure, are connected to an X driver 13$x$ while the horizontal electrodes 12$y$ are connected to a Y driver 13$y$. The X driver 13$x$ selectively applies a scanning pulse to one of the electrodes 12$x$ at a time. Likewise, the Y driver 13$y$ selectively applies a scanning pulse to one of the electrodes 12$y$ at a time. A timing controller 14 causes each of the X driver 13$x$ and Y driver 13$y$ to feed the scanning pulses at a particular timing.

On the other hand, an electronic pen 15 has its tip or point put on the tablet 11 in accordance with desired coordinates. The pen 15 includes an electrode, not shown, at the point thereof, so that a charge is induced in the electrode on the basis of capacity. The induced charge is detected by an amplifier 16 and then applied to an X differential amplifier 17$x$ and a Y differential amplifier 17$y$. The differential amplifiers 17$x$ and 17$y$ have their one input opposite in direction connected to ground, as illustrated. In this condition, the amplifier 17$x$ detects a change in charge in the X direction while the amplifier 17$y$ detects a change in charge in the Y direction. The outputs of the differential amplifiers 17$x$ and 17$y$ are fed to an X coordinates determining circuit 18$x$ and a Y coordinates determining circuit 18$y$, respectively. The timing controller 14 delivers to each of the coordinates determining circuits 18$x$ and 18$y$ a timing signal indicative of the timing for applying the pulses. The position of the pen 15 on the tablet 11 is detected on the basis of a relation between the time when the charge is maximum and the electrodes 12$x$ and 12$y$. The result of this detection is output from an X coordinate output terminal 19$x$ and a Y coordinate output terminal 19$y$.

The scanning pulse is sequentially applied to the electrodes 12$x$ and 12$y$ which are perpendicular to each other. The charge detected by the pen 15 increases in absolute value with a decrease in the distance between the position where the point of the pen 11 is located on the tablet 11 and the electrodes 12$x$ and 12$y$. Hence, the pen 15 is capable of inputting coordinates if the differential amplifiers 17$x$ and 17$y$ are each provided with, e.g., a counter for counting an interval between the time when the timing controller 14 starts scanning for one period and the time when the output of the differential amplifier 17$x$ or 17$y$ becomes maximum in the above period.

Figure 2:
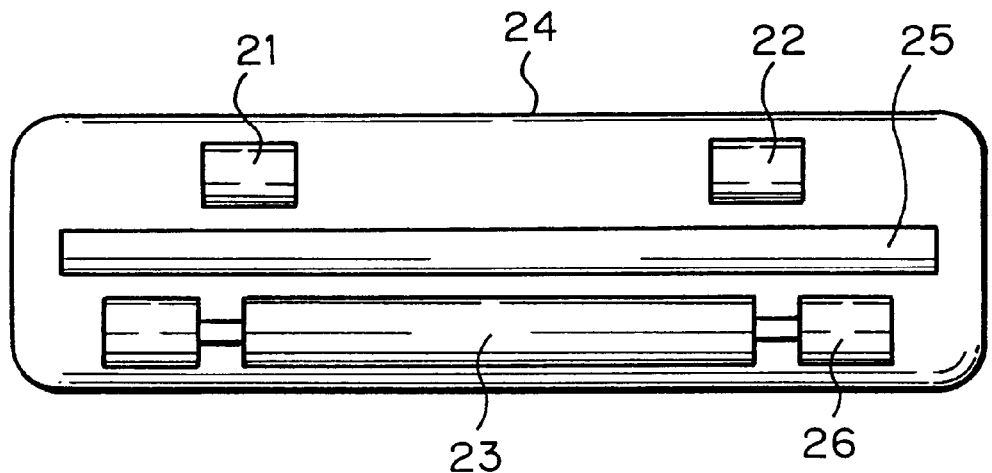
FIG. 2 is a bottom view of a conventional handy scanner which is a specific form of an image inputting device.
Figure 3:
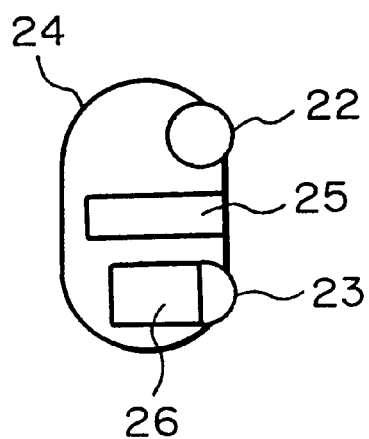
FIG. 3 is a side elevation showing the constituents of the scanner of FIG. 2.

FIG. 2 shows a conventional handy scanner which is a specific form of an image inputting device. As shown, the handy scanner has rollers 21–23 rollable on an image reading surface and slightly protruding from the bottom of a casing 24. Specifically, the roller 23 is longer than the rollers 21 and 22 and extends in parallel to the common axis of the rollers 21 and 22. A linear image sensor 25 is between the rollers 21 and 22 and the roller 23. The image sensor 25 extends over an image reading width and adjoins the image reading surface. An encoder 26 is provided coaxially with the roller 23 in order to sense the movement of the image sensor 25 in the subscanning direction. FIG. 3 shows the rollers 22 and 23, image sensor 25 and encoder 26 in a side elevation.

After the handy scanner has been so positioned as to cause the rollers 21–23 to contact the surface of a document, the casing 24 is held by hand and then moved in the subscanning direction perpendicular to the lengthwise direction of the image sensor 25. The image sensor 25 has a number of reading elements arranged thereon in the lengthwise direction. Every time the rollers 21–23 roll in an amount corresponding to one pitch in the subscanning direction, the encoder 26 detects it and causes the image sensor 25 to scan the document in the main scanning direction. The resulting image signals representative of a density distribution line by line are combined to produce a bidimensional image.

Different inputting devices have been developed for the pointing device and image inputting device described above. However, the inputting device is disadvantageous since both of the two different devices must be put on a desk together, occupying a substantial space. In addition, the two inputting units must be held by hand alternately or must be replaced with each other on the desk, resulting in inefficient manipulation. Further, the problem with the conventional handy scanner is that it cannot be reduced in width, i.e., length in the subscanning direction. Hence, the scanner conceals the image reading area over a substantial width including the line being input. This prevents the operator from accurately seeing the portion being read. Moreover, data available with an encoder built in the scanner are not absolute coordinates representative of the reading surface, but they are relative coordinates, i.e., amounts of rolling or movement. Hence, once the scanner is brought out of contact with the reading surface, the portion to be read next must be matched to the portion previously read.

Preferred embodiments of the data inputting device in accordance with the present invention will be described hereinafter.

1st Embodiment

Figure 4:
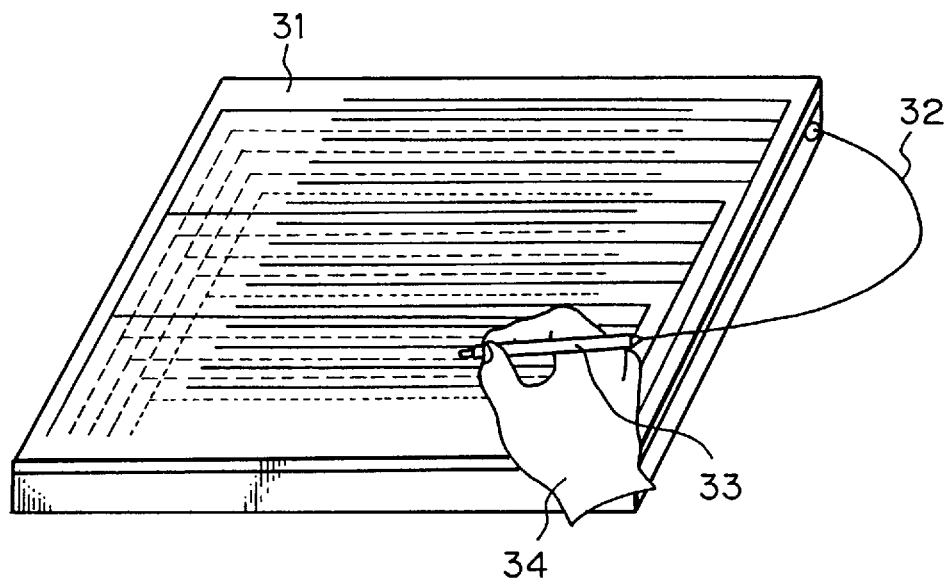
FIG. 4 is a perspective view demonstrating how a first embodiment of the data inputting device in accordance with the present invention is used in a coordinates input mode.
Figure 5:
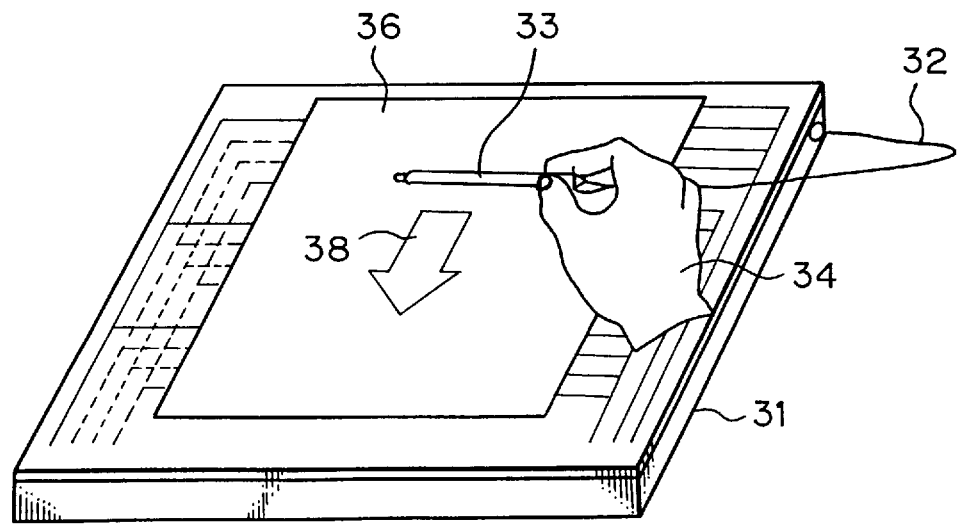
FIG. 5 is a view similar to FIG. 4, showing how the device is used in an image input mode.

Referring to FIG. 4, a data inputting device embodying the present invention is shown. As shown, the device includes a tablet 31 and a pen type inputting unit 33 connected to the tablet 31 by a cable 32. As shown in FIG. 4, when the operator holds the inputting unit 33 by hand 34 and manipulates it like an ordinary pen, the coordinates of the position where the pen 33 has contacted the tablet 31 is input. As shown in FIG. 5, a document 36 is laid on the tablet 31 and, preferably, fixed in place by, e.g., adhesive tapes, not shown. Assume that the operator lays the inputting unit 33 flat on the document 36 in the main scanning direction, as shown in FIG. 5, and then moves it in the subscanning direction 38. Then, a linear image sensor, not shown, built in the inputting unit 33 sequentially senses the image of the document 36 one line at a time. It is noteworthy that the image reading portion of the inputting unit 33 can be provided with a length smaller than the width of the image reading area of the document 36. That is, the operator should only repeat image reading a plurality of times in the subscanning direction while causing the adjoining areas to slightly overlap each other just like mopping the floor.

The tablet 31 shown in FIGS. 4 and 5 is essentially similar to the conventional tablet 11 of FIG. 1 and will not be described specifically in order to avoid redundancy.

Figure 6:
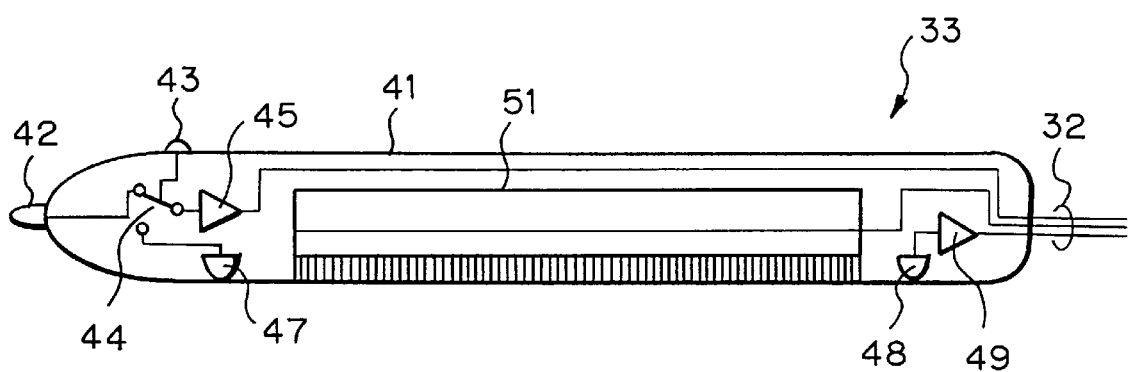
FIG. 6 shows the general configuration of a pen type inputting unit included in the embodiment.

As shown in FIG. 6, the inputting unit 33 has a pen-like hollow casing 41 made of transparent plastic or resin. An electrode 42 is studded on the tip of the casing 41 and detects coordinates on the tablet 31. A switch 43 is located on the casing 41 at a position which the operator, holding the casing 41, will touch with the tip of his or her forefinger. When the operator's forefinger touches the switch 43, a switching circuit 44 built in the casing 41 senses it and connects the electrode 42 to the input of a first signal detecting circuit 45.

Figure 7:
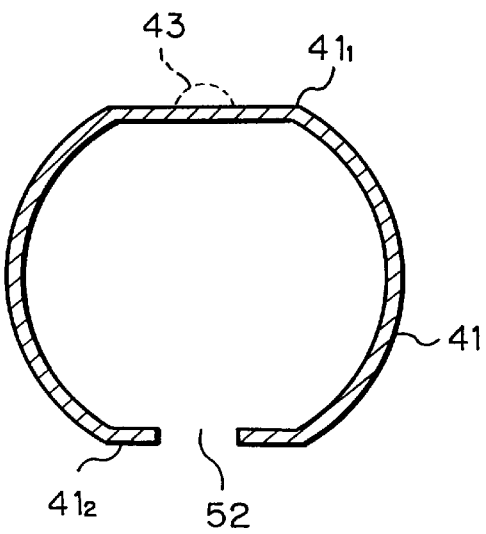
FIG. 7 is a cross-section of a casing included in the inputting unit of FIG. 6.

As shown in FIG. 7 in a cross-section, the casing 41 is a hollow cylinder having a diameter of about 1 cm. Two arcuate portions of the cylinder facing each other are deformed to form first and second flat portions $41_1$ and $41_2$, respectively. A slot 52 is formed in the second flat portion $41_2$ and extends in the axial direction of the casing 41 over a predetermined reading width. The switch 43 is positioned in the vicinity of the end of the first flat portion $41_1$.

As shown in FIG. 6, a first electrode 47 responsive to a position in the subscanning direction is mounted on the inner periphery of the flat portion $41_2$ facing the flat portion $41_1$. When the operator's finger is absent on the switch 43, the switching circuit 44 connects the electrode 47 to the input of the signal detecting circuit 45. A second electrode 48, also responsive to a position in the subscanning direction, is mounted on the inner periphery of the flat portion $41_2$, FIG. 7, adjacent to the other or rear end of the casing 41. The output of the electrode 48 is connected to the input of a second signal detecting circuit 49. When the inputting device 33 reads the document 36, FIG. 5, the electrodes 47 and 48 each detects a position on the tablet 31, FIGS. 4 and 5, in the subscanning direction. In principle, the electrodes 47 and 48 are identical with the electrode 42 located at the tip of the casing 41. A linear image sensor 51 is disposed in the casing 41 between the electrodes 47 and 48. The cable 32 is made up of a signal line extending from the image sensor 51 and signal lines respectively extending from the signal detecting circuits 45 and 49.

Figure 8:
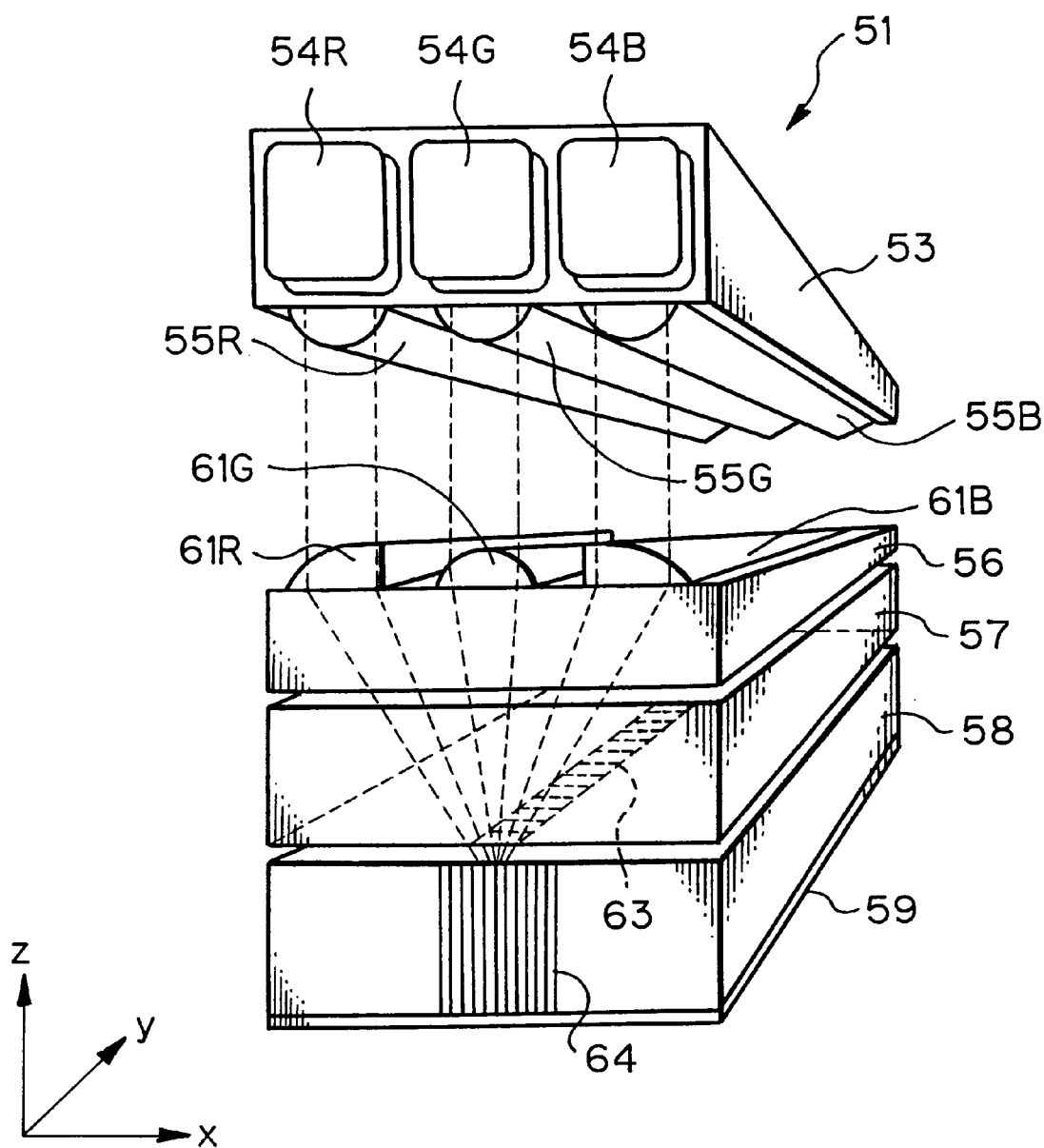
FIG. 8 is a perspective view of a linear image sensor included in the inputting unit of FIG. 6.

FIG. 8 shows the linear image sensor 51 specifically. As shown, the image sensor 51 has a light source section 53 made up of R (Red), G (Green) and B (Blue) LED (Light Emitting Diode) arrays 54R, 54G and 54B, and first condensing lenses 55R, 55G and 55B. The LED arrays 54R, 53G and 54B are parallel to each other and arranged at predetermined intervals. The lenses 55R, 55G and 55B respectively face the LED arrays 54R–54B and condense light issuing from the associated LED arrays 54R–54B to output substantially parallel light. A light condensing section 56, a light-sensitive section 57, a fiber-optic section 58, and a protection layer 59 are sequentially arranged below the light source section 53 in this order. The protection layer 59 is located at the slot 52 of the flat portion $41_2$ shown in FIG. 7. Hence, an image is directly read by the image sensor 51 via the protection layer 59.

The condensing section 56 has second condensing lenses 61R, 61G and 61B facing the lenses 55R, 55G and 55B, respectively. Light from the lenses 61R, 61G and 61B is incident to the fiber-optic section 58 via the gaps of a light-sensitive element array 63 provided on the underside of a transparent insulative substrate which constitutes the light-sensitive section 57. The fiber-optic section 58 has an array of optical fibers 64 extending along the light-sensitive element array 63 (y axis direction) over the entire length of the array 63. The section 58 has a width defined by a plurality of optical fibers 64. The light passed through the gaps of the light-sensitive element array 63 is routed through the protection layer 59 to the document surface. The resulting reflection from the document surface is incident to the light-sensitive element array 63.

Figure 9:
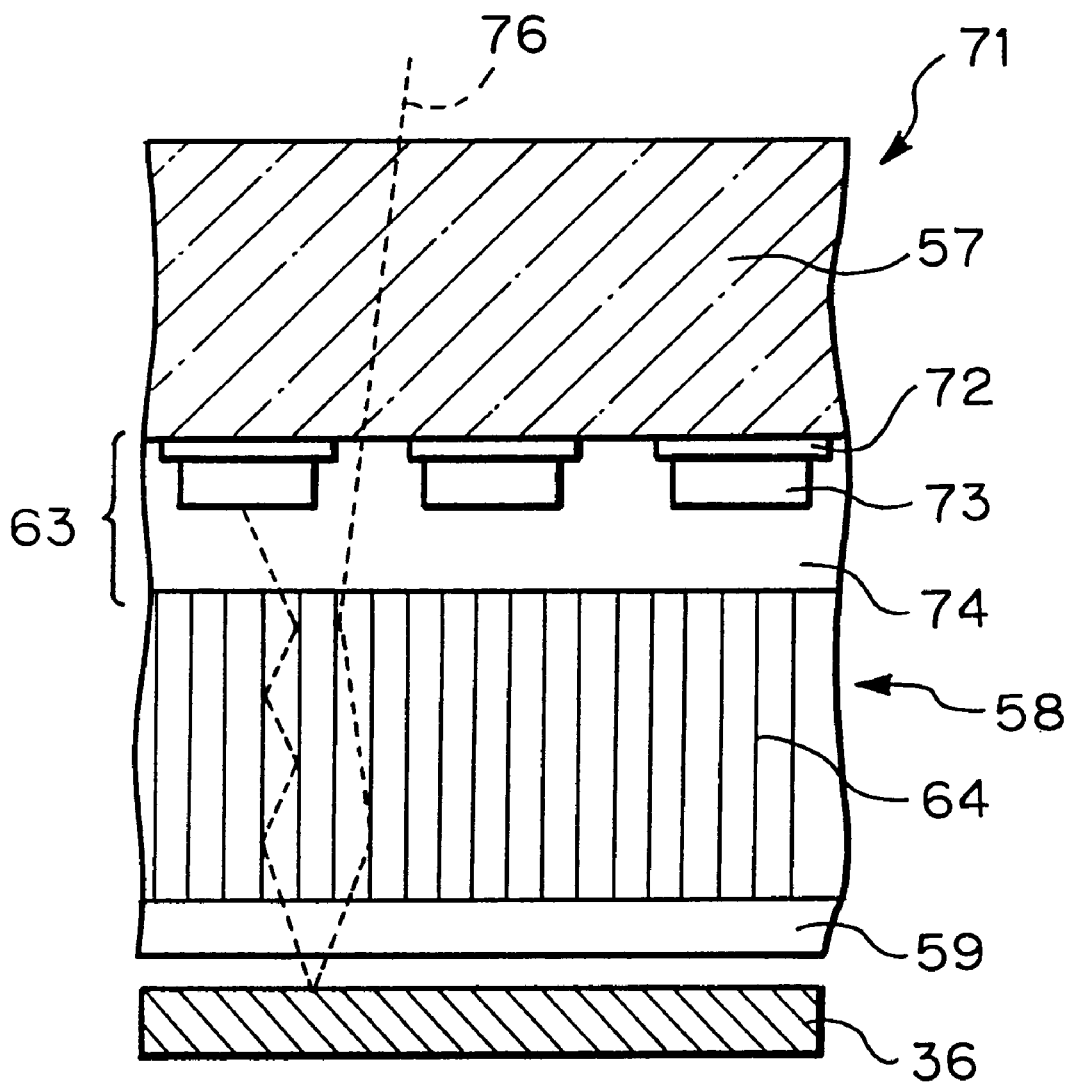
FIG. 9 is a fragmentary section in an x-z plane of FIG. 8, showing a relation between the image sensor and the surface of a document.

FIG. 9 is a fragmentary section showing the image sensor 51 in an x-z plane, FIG. 8, in relation to the surface of the document 36 to be read. As shown, screen layers 72 are arranged on the underside of a transparent insulative substrate 71 at predetermined intervals in a comb-like pattern, and each has a predetermined width. A light-sensitive element 73 is provided on each of the screen layers 72. A protection layer 74 is formed on the bottom of the substrate 71 while covering the screen layers 72 and light-sensitive elements 73. These constitute the light-sensitive element array 63 in combination. In this configuration, the light-sensitive section 57 is coupled to the fibers 64 via the protection layer 74 while the fiber-optic section 58 substantially closely contacts the surface of the document 36 via the protection layer 59.

In FIG. 9, light 76 from the light source section 53, FIG. 8, is incident to the transparent insulative substrate 71. The part of the light transmitted through the gaps between the screen layers 72 is incident to the upper ends of the fibers 64 and sequentially propagated downward through the fibers 64 to the document 36 in a direction z while being subjected to repeated total reflection. The resulting reflection from the document 36 is incident to the lower ends of the fibers 64 via the protection layer 59 and sequentially propagated upward through the fibers 64 to the protection layer 74 in the direction z. The light from the protection layer 74 reaches the light-sensitive elements 73. As a result, the image sensor 51 senses the density distribution of the document 36.

In the image sensor 51 shown in FIGS. 8 and 9, the total dimension of the fiber-optic section 58 and light-sensitive section 57 is about 1 mm in the direction z. The total dimension of the light-source section 53 and condensing section 56 is about 2 mm to about 4 mm in the direction z.

Hence, the overall dimension in the direction z is about 4 mm to about 6 mm and small enough to be accommodated in the casing 41, FIG. 7, whose diameter is about 1 cm.

How the embodiment allows data to be input will be described with reference to FIGS. 4–9. As shown in FIG. 4, in a coordinates input mode, the operator holds the inputting unit 33 with his or her hand 34 like an ordinary pen, and then moves it on the tablet 31 while maintaining the pen-point electrode 42 in contact with the tablet 31. In this mode operation, the operator continuously touches the switch 43 with, e.g., forefinger. As a result, a signal from the electrode 42 is input to the first signal detecting circuit 45. At this instant, scanning pulses are sequentially applied to electrodes arranged in the tablet 31 in the X and Y directions, as stated with reference to FIG. 1. As a charge is induced in the electrode 42, the signal detecting circuit 45 detects a change in charge in the X direction and a change in charge in the Y direction. In response to the resulting outputs of the circuit 45, an X coordinates and a Y coordinates determining circuit, not shown, respectively determine the X and Y coordinates of the point where the electrode 42 contacts the tablet 31. Consequently, the coordinate data determined by the circuit 45 are sent to the previously mentioned signal processor via the cable 32. When the electrode 42 is moved on the tablet 31, sequential coordinates data representative of the locus of the electrode 42 are sent to the data processor via the cable 32.

As shown in FIG. 5, in an image input mode, the operator holds the intermediate portion of the inputting unit 33 with his or her hand 34. Then, the operator moves the inputting unit 33 in a predetermined direction (subscanning direction) while maintaining the flat portion $41_2$ in contact with the document 36. In this case, the operator's hand 34 does not touch the switch 43, so that the switching circuit 44 selects the electrode 47. In this condition, the signal detecting circuit 45 determines X and Y coordinates where the electrode 47 is located, on the basis of a charge induced in the electrode 47. The coordinates data are sent to the data processor. The other signal detecting circuit 49 determines X and Y coordinates where the electrode 48 is located, also on the basis of a charged induced in the electrode 48. These coordinates data are also sent to the data processor. Further, an image signal output from the image sensor 51 is sent to the image processor.

The image processor, therefore, receives the coordinates data representative of the absolute coordinates of both ends of the image sensor 51, and the line-by-line image signal. In this condition, the R, G and B LED arrays 54R–54B sequentially and repeatedly emit respective light. As a result, the image sensor 51 reads color image data out of the document 36 in the form of R, G and B data. Further, the absolute coordinates of both ends of the image sensor 51 are indicative of which portion of the document 36 it is reading. Hence, even when the inputting unit 33 is released from the document 36 during operation, two successive image areas can be readily matched to each other only if the the unit 33 is again moved on the document 36. Moreover, even when the reading width of the image sensor 51 is smaller than the width of the document 36, it is only necessary for the inputting unit 33 to be sequentially moved over a plurality of regions assumed on the document 36 in the widthwise direction. This can also be done because the coordinates data are representative of the absolute coordinates of both ends of the image sensor 51.

Figure 10:
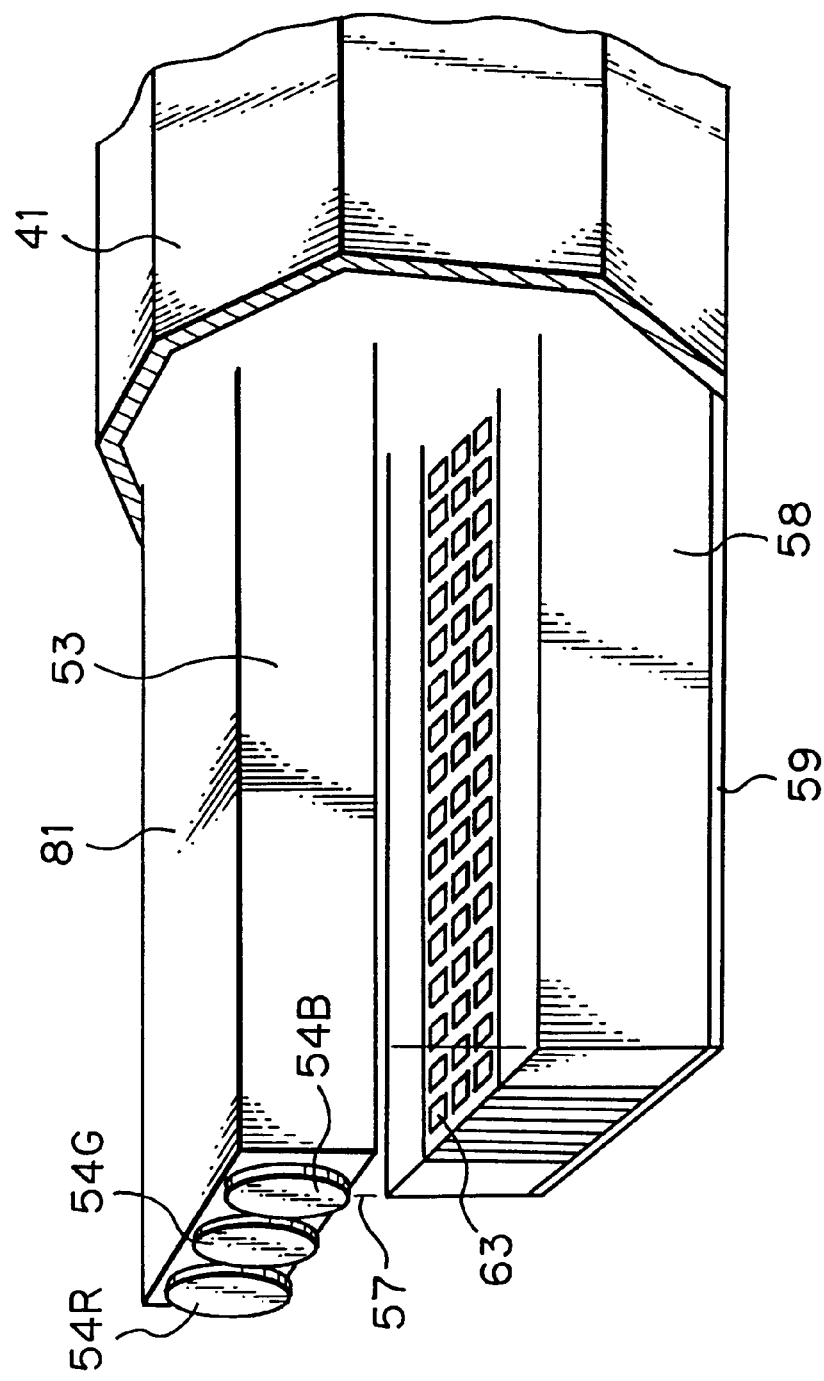
FIG. 10 shows a modified form of the first embodiment.

In FIG. 7, the casing 41 is shown as having a cross-section which is the combination of arcuate portions and flat portions. Alternatively, the casing 41 may be provided with a hexagonal, square, triangular or similar polygonal cross-section. For example, FIG. 10 shows the casing 41 having a nonagonal cross-section. As shown, the casing 41 has nine faces one of which is formed by the protection layer 59 of the fiber-optic section 58. The protection layer 59 directly contacts the document during the course of reading operation. A diffuser 81 is provided on the top of the light source section 53 in order to diffuse light. In this modified configuration, light sequentially issuing from the LED arrays 54R, 54G and 54B is diffused by the diffuser 81 and then focused onto the document.

The above embodiment and modification thereof have been shown and described as detecting coordinates on the basis of the capacity coupling between the tablet 31 and, e.g., the pen-point electrode 42. Alternatively, there may be used any conventional coordinates detection scheme, e.g., one using electromagnetic induction, ultrasonic wave, light, or sound.

2nd Embodiment

Figure 11:
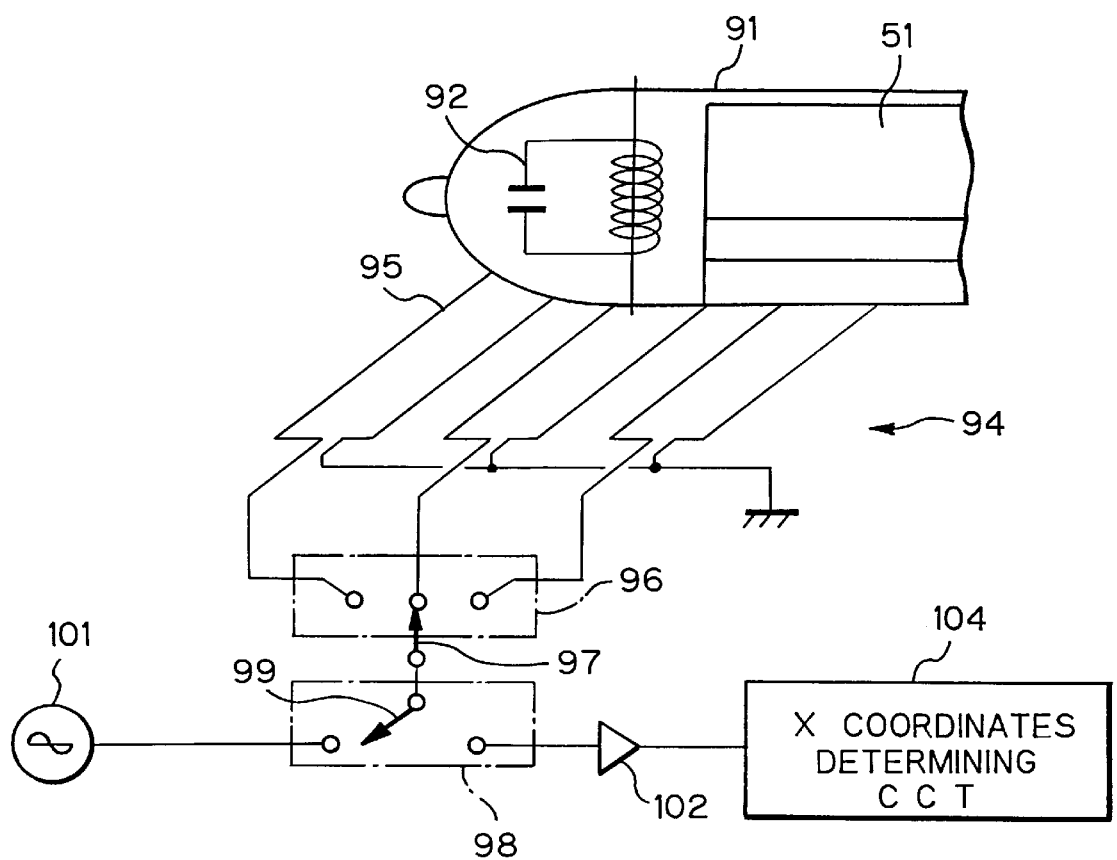
FIG. 11 shows a second embodiment of the present invention.

FIG. 11 shows the principle of an alternative embodiment of the present invention using electromagnetic transfer. As shown, a pen type inputting unit 91 has a resonance circuit 92 together with the linear image sensor 51. Loop-like coils 95 are arranged on a tablet 94 at predetermined intervals, and each extends in the X direction.

The coils 95 are connected to ground at one end and connected to a first switching circuit 96 at the other end. The switching circuit 96 has a first contact 97 for sequentially selecting the coils 95 at a predetermined period. The first contact 97 is connected to a second contact 99 included in a second switching circuit 98. While the first contact 97 selects one of coils 95, the second contact 99 selects each of a high frequency generator 101 and a signal detection circuit 102 once. Coils are also arranged in the Y direction on the tablet 94 and connected to a similar switching circuit, although not shown in order to avoid complexity.

In operation, when one of the coils 95 is selected by the contact 97, a high frequency is applied from the high frequency generator 101 to the coil 95 via the contacts 99 and 97. The resonance circuit 92 stores the resulting electromagnetic wave as electromagnetic energy for a moment. When the signal detection circuit 102 is selected by the contact 99 in place of the high frequency generator 101, the electromagnetic energy stored in the resonance circuit 92 is detected by the circuit 102. This is repeated every time the contact 97 selects the next coil 95. The energy detected by the signal detecting circuit 102 is fed to an X coordinates determining circuit 104. This circuit 104 compares the outputs of the signal detecting circuit 102 as to energy and thereby determines that one of the coils 95 generated the greatest energy is representative of the X coordinate. This is also true with the Y coordinates although not shown or described in order to avoid redundancy. Such a greatest energy scheme may be replaced with a center of gravity scheme, if desired. The center of gravity scheme calculates the center of gravity on the basis of the analog outputs of the coils 95, thereby determining the coordinates indicated by the inputting unit 91. The center of gravity scheme is capable of detecting coordinates with a resolution higher than the pitch of the coils 95.

3rd Embodiment

Figure 12:
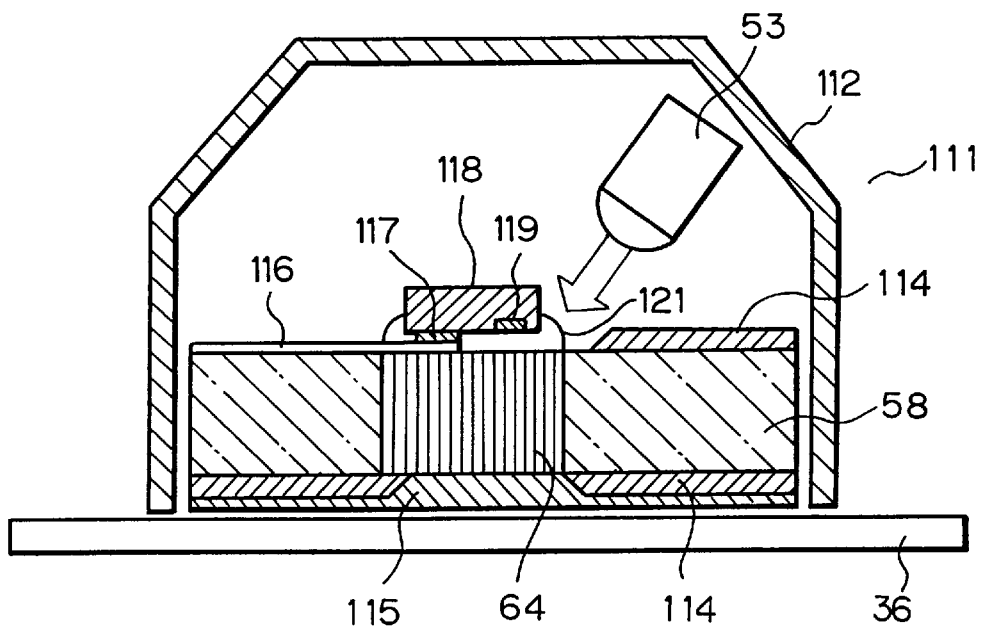
FIG. 12 is a section showing a third embodiment of the present invention.

Referring to FIG. 12, a third embodiment of the present invention will be described. In FIG. 12, the same or similar constituents as or to the constituents shown in FIG. 9 are designated by the same reference numerals, and a detailed description thereof will not be made in order to avoid redundancy. As shown, the inputting unit, generally 111, has a bottom-open casing 112 accommodating the focusing section 58 therein. A screen layer 114 covers the bottom of the fiber-optic section 58 except for the lower ends of the fibers 64. A protection layer 115 covers the lower ends of the fibers 64 and the screen layer 114. The screen layer 114 intercepts extraneous light except for the imagewise reflection from the document 36.

A screen layer 114 and a circuit conductor layer 116 are formed on the top of the fiber-optic section 58 and respectively positioned at the right-hand side and the left-hand side, as viewed in FIG. 12, with respect to the upper ends of the fibers 64. The circuit conductor layer 116 extends as far as substantially the intermediate between the outermost fibers 64, as seen in FIG. 12. A CCD image sensor or similar crystalline Si (silicon) image sensor 118 is mounted on the edge of the layer 116 by a connecting part 117. Light-sensitive elements 119 are arranged on the bottom of the image sensor 118 and spaced a predetermined distance from the edge of the image sensor 118. The elements 119 face the upper ends of the fibers 64. A transparent protection layer 121 intervenes between the upper ends of the fibers 64 and the light-sensitive elements 119. The light source section 53 identical in construction as the section 53 of the first embodiment is positioned obliquely above the light-sensitive elements 119 and sequentially emit R, G and B light.

In operation, the light issuing from the light source section 53 is incident to the upper ends of the fibers 64 via the protection layer 121. The light is propagated downward through the fibers 64 while being subjected to repeated total reflection, until it reaches the document 36. The resulting reflection from the document 36 is incident to the lower ends of the fibers 64 and then propagated upward through the fibers 64 until it reaches the light-sensitive elements 119.

This embodiment is different from the first embodiment in that the side of the image sensor 118 carrying the light-sensitive elements 119 is not transparent. This also successfully generates an image signal representative of the density distribution of the document 36.

The R, G and B LED arrays used in the embodiments and modifications thereof are only illustrative. For example, the color LED arrays may be replaced with a white light source, e.g., cold cathode tube. In this case, three light-sensitive arrays will be provided and respectively covered with color filters of different colors. Even only two colors or a single color can be read, depending on the application. When a single color suffices, the LEDs or similar light sources can, of course, be replaced with a monocolor light source, and the color filters are not necessary.

Figure 13:
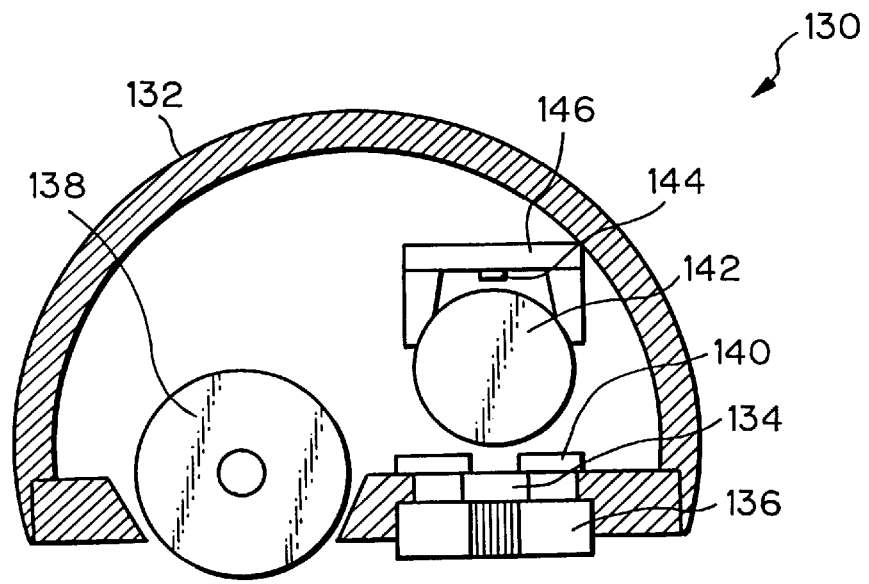
FIG. 13 shows one of miniature handy scanners.

FIG. 13 shows a pen type scanner having a diameter of less than 2 cm. As shown, the scanner, generally 130, has a casing 132, and an image sensor 134 accommodated in the casing 132 and capable of fully contacting a document. Optics 136 and a roller 138 are mounted on the bottom of the casing 132. Image data representative of a document image is incident to the sensor 134 via the optics 136. The roller 138 is used to generate timing pulses in the subscanning direction and to guarantee the linear movement of the scanner 130. There are also shown in FIG. 13 a printed circuit board 140, a rod lens 142, an LED 144, and an LED mounting printed circuit board 146.

In practice, however, the scanner 130 is not easy to hold because the bottom thereof is angular. Moreover, because the bottom of the scanner 130 is constantly exposed, it is easily scratched or smeared and, in addition, allows dust and other impurities to enter via the gap between the roller 138 and the casing 132. The dust would lower the reading ability of the scanner 130.

A fourth to a sixth embodiment of the present invention capable of eliminating the above problems of the scanner 130 will be described hereinafter and are implemented as a scanner without exception.

4th Embodiment

Figure 14A:
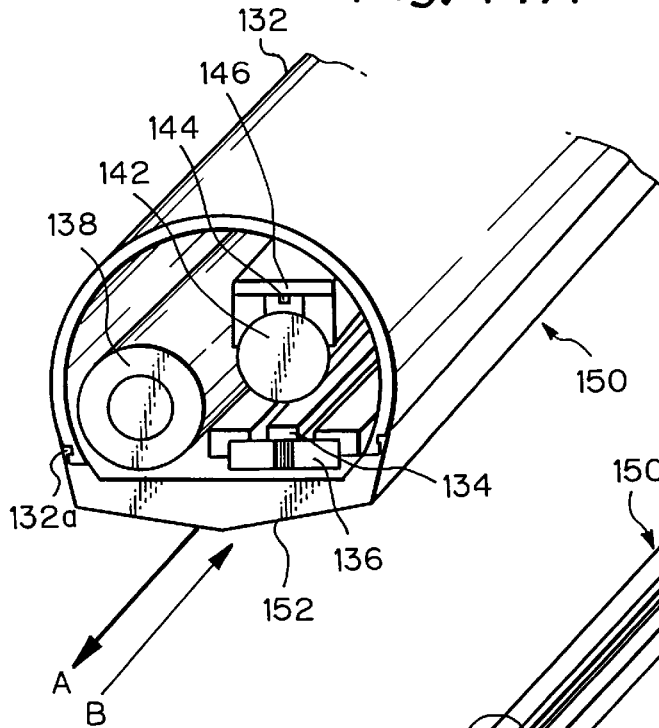
FIGS. 14A–14C show a fourth embodiment of the present invention constituting an improvement over the handy scanner of FIG. 13.
Figure 14B:
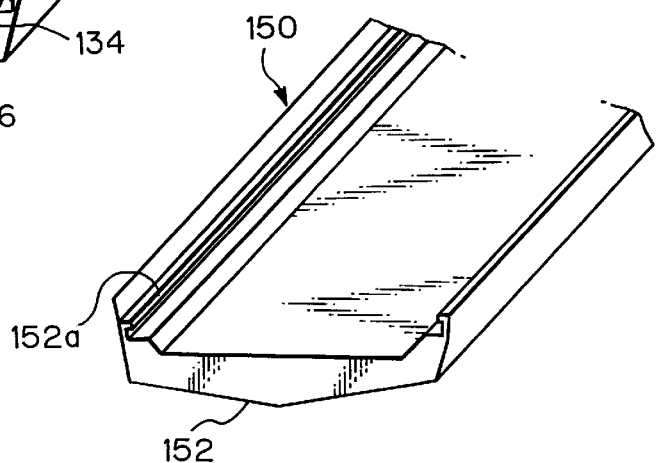
Figure 14C:
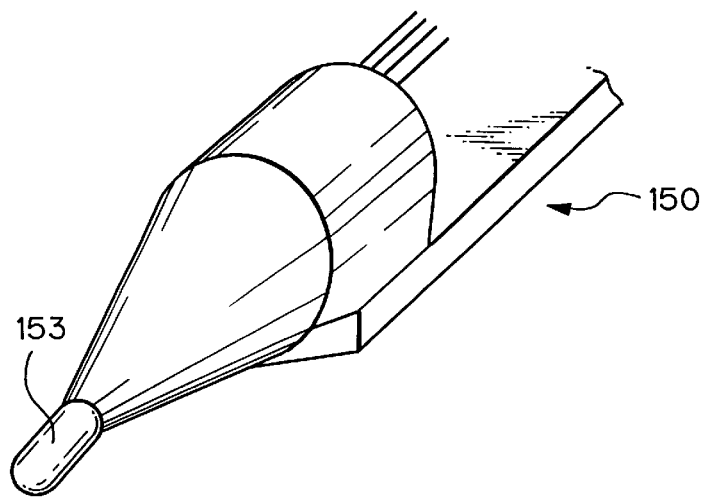

As shown in FIGS. 14A–14C, a pen type scanner 150 is shown and essentially similar to the scanner 130 of FIG. 13 except for a slidable cover 152 covering the bottom of the scanner 150. As shown in FIG. 14B, the cover 152 is formed with a pair of ridges or rails 152a on the inner periphery thereof. As shown in FIG. 14A, the rails 152a respectively mate with elongate channels 132 formed in the outer periphery of a casing 132 adjacent to the bottom of the casing 132, so that the cover 152 is slidable on and along the bottom of the casing 132. Specifically, the cover 152 is slid out of the casing 132 in a direction A or slid into the casing 132 in a direction B. FIG. 14A shows the cover 152 mounted to the casing 132. FIG. 14C shows a point 153 provided on the pen 153.

When the cover 152 is mounted to the scanner 152, the scanner 152 is operable as a pointing device. When the cover 152 is removed from the casing 132, the scanner 152 is usable as an image inputting device. The cover 152 itself may be provided with the pointing function, if desired.

5th Embodiment

Figure 15A:
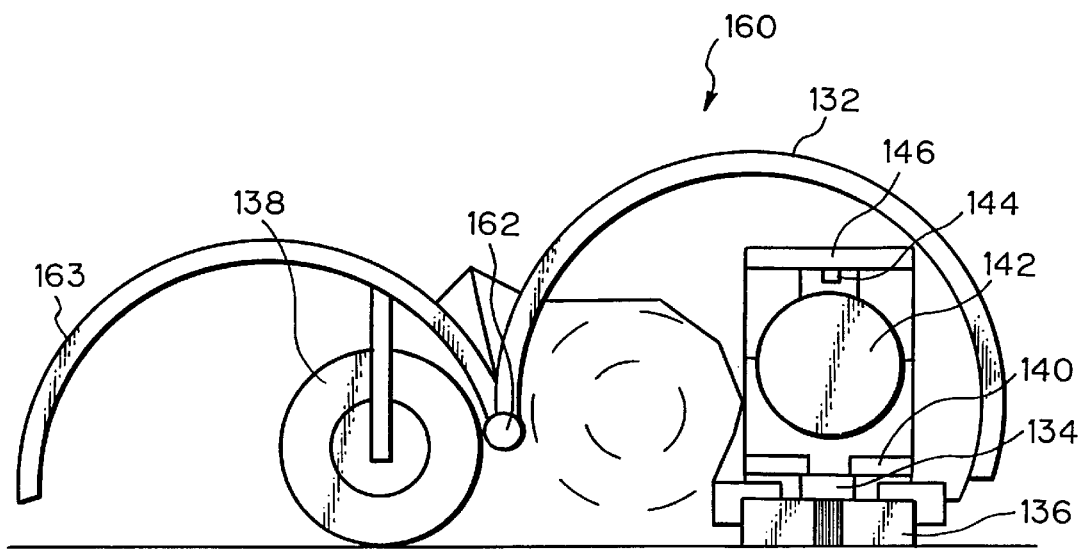
FIGS. 15A and 15B show a fifth embodiment of the present invention.
Figure 15B:
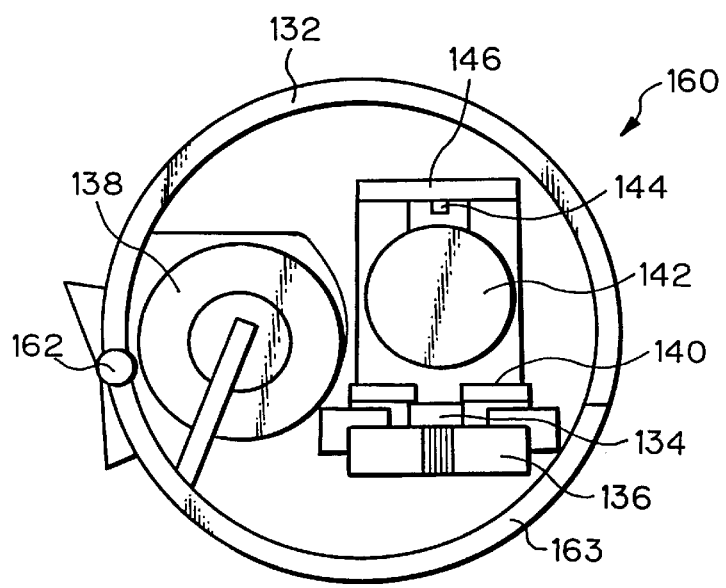

As shown in FIGS. 15A and 15B, a scanner 160 is shown and similar to the above scanner 150 except that the slidable cover 150 is replaced with a cover 163 hinged to the casing 132. As shown, the cover 163 is mounted to one side of the casing 132 by a hinge 162 and openable about the hinge 162, as needed. The roller 138 is mounted on the cover 163. As shown in FIG. 15A, when the cover 163 is opened, the scanner 160 is usable as an image inputting device. By closing the cover 163, as shown in FIG. 15B, it is possible to use the scanner 160 as a pointing device.

6th Embodiment

Figure 16A:
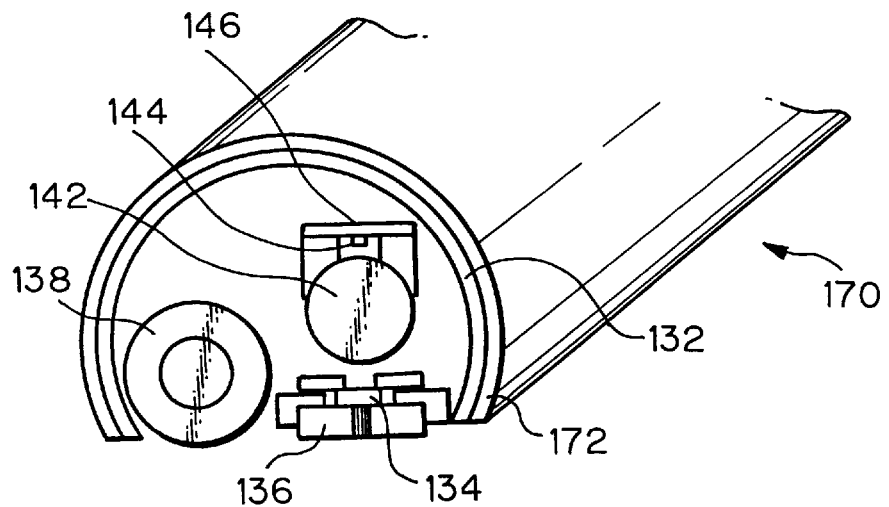
FIGS. 16A and 16B show a sixth embodiment of the present invention also constituting an improvement over the conventional handy scanner.
Figure 16B:
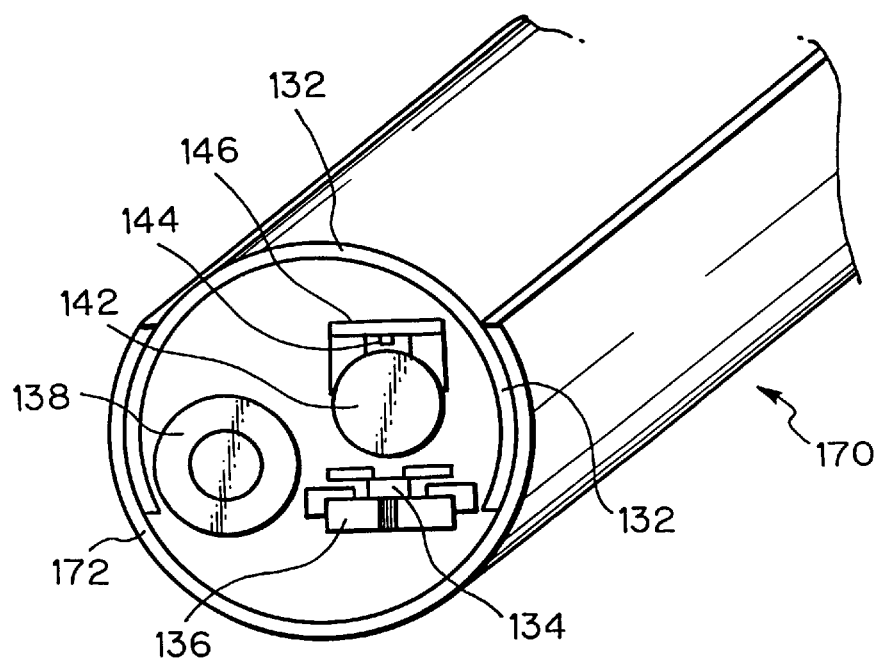

As shown in FIGS. 16A and 16B, a scanner 170 is shown and similar to the fourth or the fifth embodiment except that a cover 172 is substituted for the cover 152 or 163. As shown, the cover 172 is turnable about the axis of and along the semicircular outer periphery of the casing 132. The scanner 170 is operable as an image inputting device when the cover 172 is opened, as shown in FIG. 16A, or it is operable as a pointing device when the cover 172 is closed, as shown in FIG. 16B.

In any one of the fourth to sixth embodiments, the handy scanner is easy to hold when playing the role of a pointing device or pen. When the handy scanner is used as an image inputting device, the cover closes the bottom of the casing and thereby protects it from scratches and smears while preventing impurities from entering the casing. The scanner with such a configuration is usable over a long period of time.

In summary, it will be seen that the present invention provides a data inputting device having various unprecedented advantages, as enumerated below.

(1) The device has an image sensor for reading a document laid on a tablet, and position detecting means capable of detecting the varying position of the image sensor. Hence, the device is capable of inputting the document image in terms of absolute coordinates. Specifically, even when the image sensor is released from the document halfway, the coordinates of a position where the sensor should resume reading can be determined. This readily matches successive image reading positions. Even when the width of the sensor is smaller than the width of the document, the image can also be input by use of absolute coordinates. Therefore, the entire image can be easily reproduced by being read in segments.

(2) A position detecting means for inputting coordinates and resembling a pen point is accommodated in a casing together with the above image sensor and position detecting means for reading an image. Hence, coordinates marked on the tablet can be input. This allows a single inputting unit to input both coordinates and an image and thereby makes it needless to selectively use two different kinds of inputting units. As a result, efficient work is promoted, and the inputting unit needs a minimum of space.

(3) The inputting unit has a pen-like configuration and is, therefore, easy to use.

(4) The image sensor has a plurality of light-sensitive elements arranged on a transparent insulative substrate in an array. Light is transmitted through the gaps between the light-sensitive elements to reach a document, while the resulting reflection from the document is incident to the light-sensitive elements. This simplifies the optics and provides the device with a compact configuration.

(5) A switch is positioned on the casing such that the operator's hand touches the switch when holding the casing in a coordinates input mode, but does not touch it in an image input mode. Therefore, the operator can operate the switch surely and easily, depending on the desired input mode. Because the switch selects either the output of the position detecting means for coordinates input or that of the position detecting means for image input, the coordinates input mode and image input mode can share single image processing means. In addition, because the output of the position detecting means not used is cut, coordinates can be detected with reliability.

Various modifications will become possible for those skilled in the art after receiving the teachings of the present disclosure without departing from the scope thereof.

What is claimed is:

1. A data inputting device comprising:
    a pen-shaped casing, having an opening and being arranged to be held in the hand of an operator of said data inputting device;
    a linear image sensor facing said opening and extending along an axis of said casing; and
    a cover for closing said opening;
        wherein said cover is hinged to one edge of said opening of said casing; and
        wherein said cover comprises a roller mounted thereon.

2. A data inputting device comprising:
    a tablet;
    tablet drive means for causing said tablet to generate a physical change representative of a position on said tablet;
    an image sensor for reading a document laid on said tablet; and
    position detecting means adjoining opposite ends of said image sensor and for analyzing, while the document is read by said image sensor, the physical change generated by said tablet drive means to thereby determine a position of said image sensor relative to said tablet;
        wherein said image sensor comprises a plurality of light-sensitive elements arranged on a transparent insulative substrate in an array at predetermined intervals, wherein light having different wavelengths is sequentially emitted from a side of said substrate where said light-sensitive elements are absent and incident to the document via gaps between said light-sensitive elements, and wherein a resulting imagewise reflection from the document is incident to said light-sensitive elements.

3. A data inputting device comprising:
    a tablet;
    tablet drive means for causing said tablet drive to generate a physical change representative of a position on said tablet;
    an image sensor for reading a document laid on said tablet;
    first position detecting means assigned to image reading, and adjoining opposite ends of said image sensor; and for detecting, while the document is read by said image sensor, the physical change generated by said tablet to determine a position of said image sensor relative to said tablet; and
    second position detecting means assigned to inputting coordinates, and having a pen point configuration, and accommodated in a same casing as said first position detecting means, and for analyzing, when put on said tablet, the physical change to determine a position on said tablet.

4. A device as claimed in claim 3, further comprising a pen-like casing having said second position detecting means at a pen point portion thereof, wherein said image sensor comprises a linear image sensor disposed in and extending along an axis of said casing, and wherein said first position detecting means is disposed in said casing in close proximity to opposite ends of said linear image sensor.

5. A device as claimed in claim 3, wherein said image sensor comprises a plurality of light-sensitive elements arranged on a transparent insulative substrate in an array at predetermined intervals, wherein light having different wavelengths is sequentially emitted from a side of said substrate where said light-sensitive elements are absent and incident to the document via gaps between said light-sensitive elements, and wherein a resulting imagewise reflection from the document is incident to said light-sensitive elements.

6. A device as claimed in claim 3, further comprising:
    a switch disposed in said casing and positioned such that an operator's hand touches said switch when holding said casing for inputting coordinates; and
    switching means for selecting said second position detecting means when the operator's hand touches said switch, and for connecting one of said second position detecting means and said first position detecting means to a shared processing means.

* * * * *